(12) United States Patent
Lentz

(10) Patent No.: US 11,096,475 B2
(45) Date of Patent: Aug. 24, 2021

(54) SURFACE ATTACHABLE WASHING APPARATUS

(71) Applicant: Daniel Jacob Lentz, Campbell, CA (US)

(72) Inventor: Daniel Jacob Lentz, Campbell, CA (US)

( * ) Notice: Subject to any disclaimer, the term of this patent is extended or adjusted under 35 U.S.C. 154(b) by 44 days.

(21) Appl. No.: 16/583,646

(22) Filed: Sep. 26, 2019

(65) Prior Publication Data

US 2020/0015582 A1 Jan. 16, 2020

Related U.S. Application Data

(63) Continuation of application No. 15/641,018, filed on Jul. 3, 2017, now Pat. No. 10,531,728.

(Continued)

(51) Int. Cl.
| | |
|---|---|
| *A46B 11/06* | (2006.01) |
| *A46B 1/00* | (2006.01) |
| *A46B 5/00* | (2006.01) |
| *A46B 5/04* | (2006.01) |
| *A46B 9/00* | (2006.01) |
| *A46B 11/00* | (2006.01) |
| *A01K 13/00* | (2006.01) |
| *A47K 3/00* | (2006.01) |
| *A47K 3/28* | (2006.01) |

(52) U.S. Cl.
CPC .......... *A46B 11/063* (2013.01); *A01K 13/001* (2013.01); *A46B 1/00* (2013.01); *A46B 5/0029* (2013.01); *A46B 5/04* (2013.01); *A46B 9/005* (2013.01); *A46B 11/0006* (2013.01); *A46B 11/0072* (2013.01); *A46B 2200/1093* (2013.01); *A47K 3/001* (2013.01); *A47K 3/281* (2013.01)

(58) Field of Classification Search
CPC ..... A46B 11/06; A46B 13/001; A46B 5/0029; A46B 5/04; A46B 9/005; A46B 11/0006; A46B 11/0072; A46B 2200/1093; A01K 13/001; A01K 13/00; A47K 3/00; A47K 3/001; A47K 3/28; A47K 3/281; A47K 3/283; A47K 2003/28; A47K 2201/02; B05B 1/18; B05B 1/185
USPC .................................... 4/597, 601, 604, 605
See application file for complete search history.

(56) References Cited

U.S. PATENT DOCUMENTS

| 836,181 A | 11/1906 | Gray |
| 1,530,327 A | 11/1923 | Redlick |

(Continued)

*Primary Examiner* — David J Walczak
(74) *Attorney, Agent, or Firm* — Williams Intellectual Property; Benjamin F. Williams

(57) ABSTRACT

A surface attachable washing apparatus enables easy control of water flow through a molded body member. A valve assembly, disposed interiorly within the body member, is actuated by simple depression of an overlying portion of an obverse surface of the molded body member, to toggle a valve assembly between each of a closed position and an open position. Water flow is therefore controllable by manual pressure to alternately emit and prevent water flow sprayed through each of a plurality of outlets. At least one suction cup enables selective positioning of the molded body member upon a surface distally situated relative to an existing water outlet to which the apparatus is connected. A user may therefore position the apparatus at a desired height in the bath room, for example, to correspond with a child who can then easily control of the water flow during bath time.

15 Claims, 6 Drawing Sheets

Related U.S. Application Data

(60) Provisional application No. 62/396,123, filed on Sep. 17, 2016.

(56) References Cited

U.S. PATENT DOCUMENTS

| | | | |
|---|---|---|---|
| 1,534,208 A | 11/1923 | Gibson | |
| 1,533,732 A | 4/1925 | Frost | |
| 2,562,418 A | 4/1950 | Enrico | |
| 2,663,890 A | 7/1950 | Sullins | |
| 4,037,790 A | 7/1977 | Resiser et al. | |
| 4,951,329 A * | 8/1990 | Shaw | A47K 3/001 4/568 |
| 5,048,759 A | 9/1991 | Mazziotta | |
| 5,722,349 A | 3/1998 | Wolgamuth | |
| 6,782,567 B1 * | 8/2004 | Austin | A63H 23/10 4/496 |
| 6,834,619 B1 | 12/2004 | Rampersad | |
| 8,794,189 B1 | 8/2014 | Dahlquist et al. | |
| 9,167,948 B2 | 10/2015 | Tucker | |
| 2006/0272086 A1 * | 12/2006 | Mesa | E03C 1/06 4/601 |
| 2013/0305998 A1 | 11/2013 | Brown et al. | |
| 2016/0073611 A1 | 3/2016 | Hightower | |
| 2019/0022671 A1 * | 1/2019 | Jack | B05B 1/185 |

\* cited by examiner

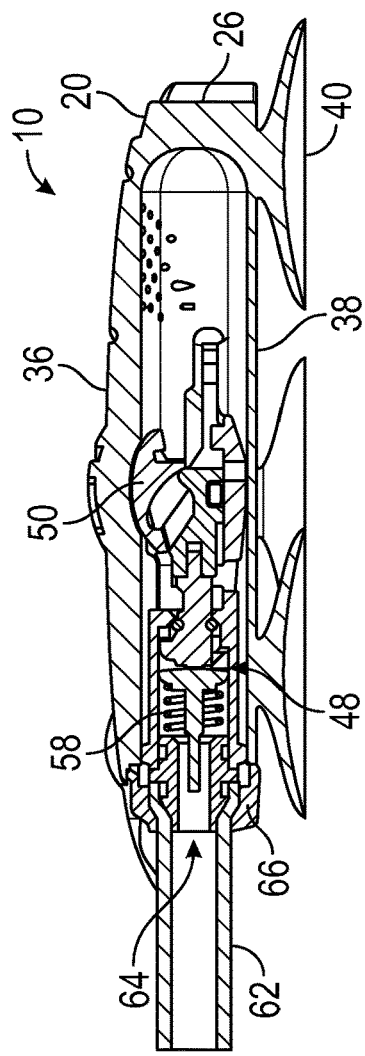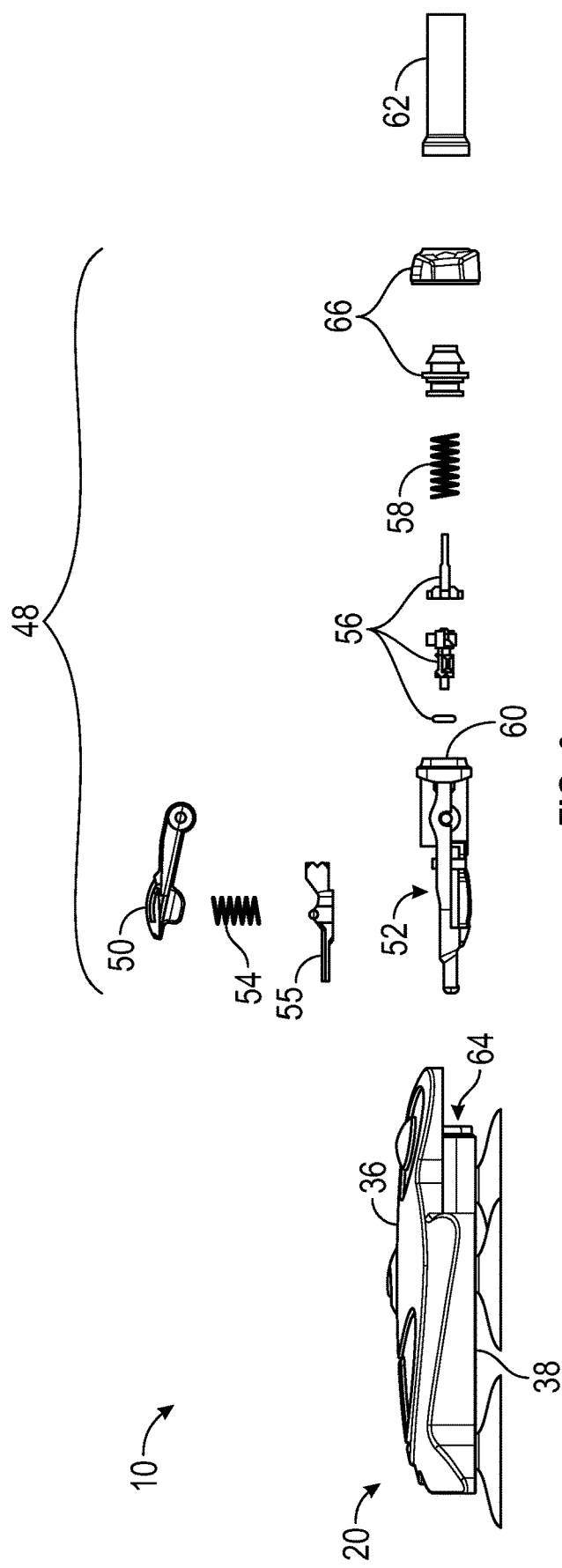

SURFACE ATTACHABLE WASHING APPARATUS

CROSS-REFERENCE TO RELATED APPLICATIONS

This continuation-in-part application claims the benefit of nonprovisional application Ser. No. 15/641,018 filed on Jul. 3, 2017, which claims the benefit of provisional application No. 62/396,123 filed on Sep. 13, 2016

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention relates to a surface attachable washing apparatus that is connectable to an existing waterline and positionable attached to a surface for use by children and other users in washing in the shower, bathtub, or elsewhere where sprayed water is desirable, such as outside in the summer, for example.

The present surface attachable washing apparatus enables singlehanded control is of water sprayed through a plurality of openings from an obverse surface of a molded body member. A valve assembly disposed interior to the molded body member enables singlehanded control of water flow through the apparatus when a user compresses the obverse surface of the molded body member. When the molded body member is formed in the likeness of an animal or character, for example, the water may be sprayed through a portion of the body member resembling the animal or character's mouth, and actuation of the water flow may be effectuated by depression of the animal or character' nose.

FIELD OF THE INVENTION

The present invention relates to a surface attachable washing apparatus devised connect to a waterline, faucet, or shower line, and secure to a proximal surface to enable directable water emission from an obverse surface in a fun capacity.

The present surface attachable washing apparatus, therefore, includes a molded body member, formed of a polymer which is pliable and yielding to the touch. The molded body member is attachable to a surface, such as a shower wall or bathtub side, by action of at least one suction cup disposed on a reverse surface of the body member.

The molded body member further includes an obverse surface having a plurality of outlets thereupon. Water is enabled passage through the molded body member for controlled emission through each of the plurality of outlets by action of a valve assembly disposed interior to the molded body member. The valve assembly is controllable by manual depression of a compressible portion, disposed interior to the molded body member at a position proximally centrally within the molded body member, which may occupy a position underlying a portion of the obverse surface devised to resemble, at least cursorily, the nose of an animal or character, for example, the likeness of which the body member may be configured to resemble. A user may, therefore, alternately enable and disable controlled emission of water by pressing the compressible portion of the body member to produce a spray of water in a desirable position relative a user, particularly young children in the bathtub or shower, for example, whereby water is emittable at a preferred height and a more useful and practical position for washing in a fun and engaging way during bath time.

SUMMARY OF THE INVENTION

The present surface attachable washing apparatus includes a molded body member connectable to a water outlet, faucet, or shower mains or line, and attachable to a surface such as the side of a bathtub or a tiled shower wall, for example, to create a spray of water at a chosen elevation relative a user, particularly a child. The general purpose of the present apparatus, therefore, is to enable positioning of a spray of water at a desired position relative a user, particularly a child, while enabling emission of water for washing in a fun and novel capacity.

In the example embodiment set forth herein, the molded body member is generally ovoid, planar, and formed, or otherwise molded, of an impermeable polymer, such as, for example, silicone. The molded body member is therefore pliable and flexible. The molded body member is preferentially molded to resemble a stylized animal or other character. The molded body member includes an obverse surface and a reverse surface. The reverse surface is generally smooth and devised for attachment to a surface by action of at least one suction cup disposed thereupon, as will be described subsequently.

The obverse surface, molded and configured preferably to resemble a stylized animal or character, includes a plurality of openings disposed to emit sprayed water when the molded body member is connected to a water outlet and a valve assembly, disposed interior to the molded body member, is toggled between a closed situation and an open situation, as will also be described subsequently.

In the example embodiment herein described, each of the plurality of openings is disposed clustered together upon a portion of the obverse surface to create the impression to a user that the water is sprayed from a specific part of the animal or character in which form the molded body member is devised to resemble. For example, the plurality of outlets may be clustered in a position to correspond with the animal or character's mouth, or other body part, as case may be. The plurality of outlets is disposed in a central cluster, essentially overtop or proximal the valve assembly interior to the molded body member, and in open communication therewith, whereby flow of water through the molded body member is effective through the central cluster. Surrounding the central cluster the obverse surface may be molded and configured to resemble a particular part of the animal or character, such as the smiling mouth of a frog, a circular mouth of an octopus, or the crown of a starfish for sand dollar, for example.

The molded body member may be delimited by a distal arced edge, a proximal arced edge, a first side apex, and a second side apex. At least one suction cup may be disposed upon the rear side of the molded body member to secure the molded body member in a position desirable to emit sprayed water onto a child, for example, using the present device during bath time. In the example embodiments herein contemplated, the at least one suction cup includes four suction cups, positioned upon the reverse surface proximal the distal arced edge, the proximal arced edge, and each of the first and second side apexes.

A connecting line is disposed interconnected into the proximal arced edge, said connecting line devised for distal attachment to a water outlet, a faucet, a shower line, or to the shower main, as case may be, wherein water is introducible into the molded body member and therein controllable by action of the valve assembly.

The valve assembly includes a compressible portion disposed against the action of a first spring member. The compressible portion is disposed interior to the molded body portion proximally located in a position appropriate upon the obverse surface in a position which may, for example, resemble another particular body part of facial feature of the animal or character the obverse surface is configured to resemble. For example, the compressible portion may underlie a portion of the obverse surface that resembles the nose of the animal or character. The compressible portion is depressible when a user presses the obverse surface immediately thereover to engage the compressible portion against the action of the first spring member. The compressible portion toggles outflow of water through the plurality of outlets by moving a switch member alternately between each of a first position and a second position whereby throughflow of water is enabled and alternately disabled.

In the example embodiment depicted herein, and described subsequently in more detail below, the switch member is disposed against the action of a second spring member. When moved to the first position, the switch member is first forced in a first direction and compresses the second spring member. The second spring member is thus tensioned against the switch member but is prevented from rebounding due to the switch member being oriented against a stop member. Throughflow of water through a valve outlet disposed in the valve assembly is now enabled, and water is thus emitted from the plurality of outlets for controlled application during bath time. Subsequent depression of the compressible portion thence disengages the switch member from the stop member, whereby the second spring member rebounds and forces the switch member to the second position, whereby the valve outlet is closed and the valve assembly subsequently rendered in the closed situation. Throughflow of water is thus disabled.

A user is thus enabled expedient control of throughflow of water during bath time and may expediently toggle the present device to spray forth water at a desired height from a position attached to a wall or surface. The polymeric molded body member is pliable and yielding and may be brightly colored. The valve assembly is therefore readily controlled by depression of the compressible portion, demarked upon the obverse surface, whereby even young users are enabled to turn the water sprayed through the plurality of outlets on and off as desired.

Thus has been broadly outlined the more important features of the present surface attachable washing apparatus so that the detailed description thereof that follows may be better understood and in order that the present contribution to the art may be better appreciated.

For better understanding of the surface attachable washing apparatus, its operating advantages and specific objects attained by its uses, refer to the accompanying drawings and description.

BRIEF DESCRIPTION OF THE DRAWINGS

Figures

FIG. 5 is a cross-section view of an example embodiment taken along the line 5-5 of FIG. 4.

FIG. 6 is an exploded view of an example embodiment.

DETAILED DESCRIPTION OF THE DRAWINGS

Figure 1:
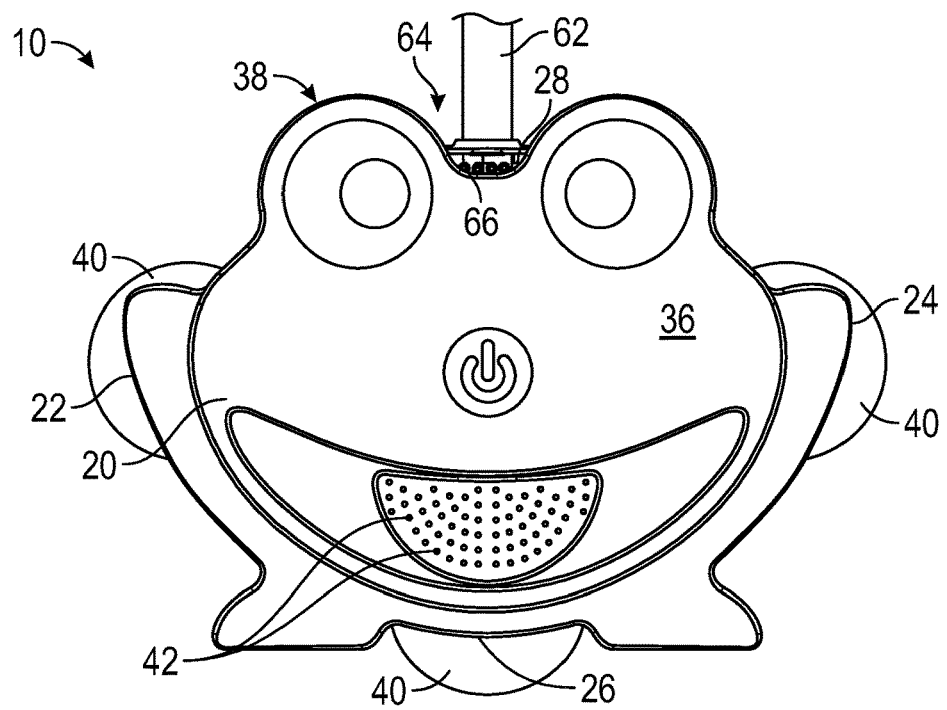
FIG. 1 is a front elevation view of an example embodiment.
Figure 2:
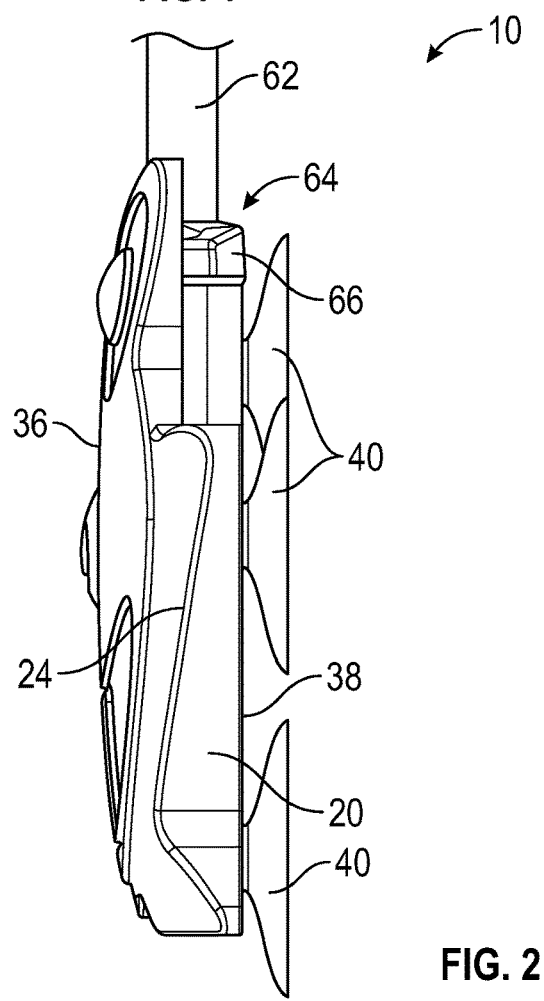
FIG. 2 is a side elevation view of an example embodiment.
Figure 3:
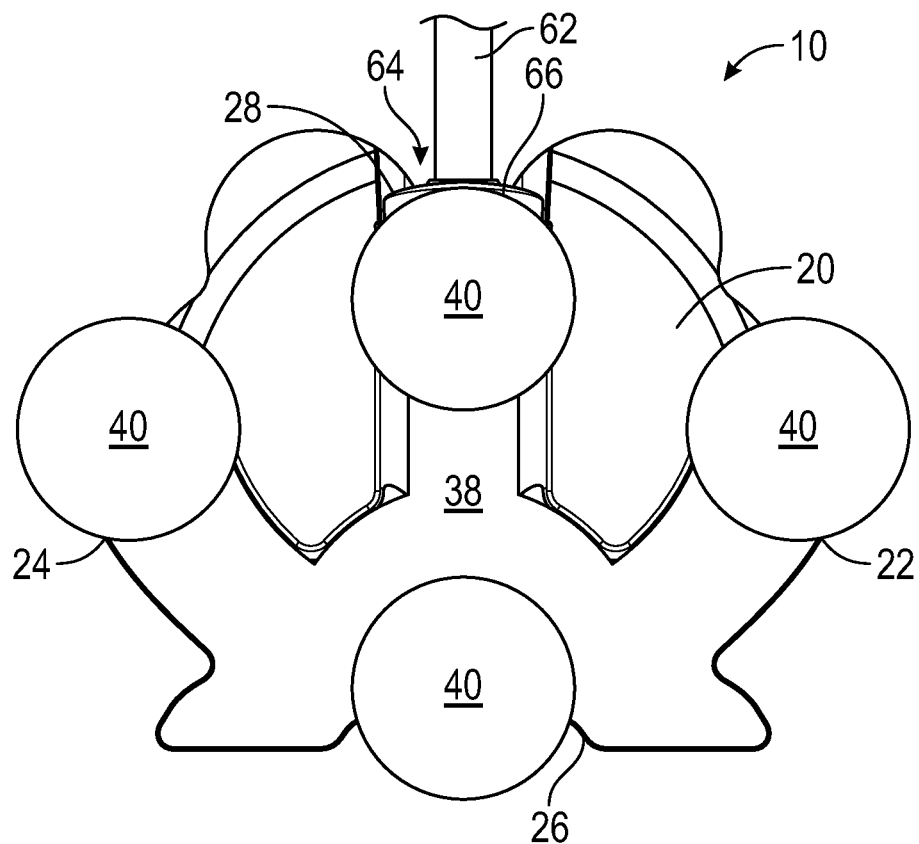
FIG. 3 Is a rear elevation view of an example embodiment.
Figure 4:
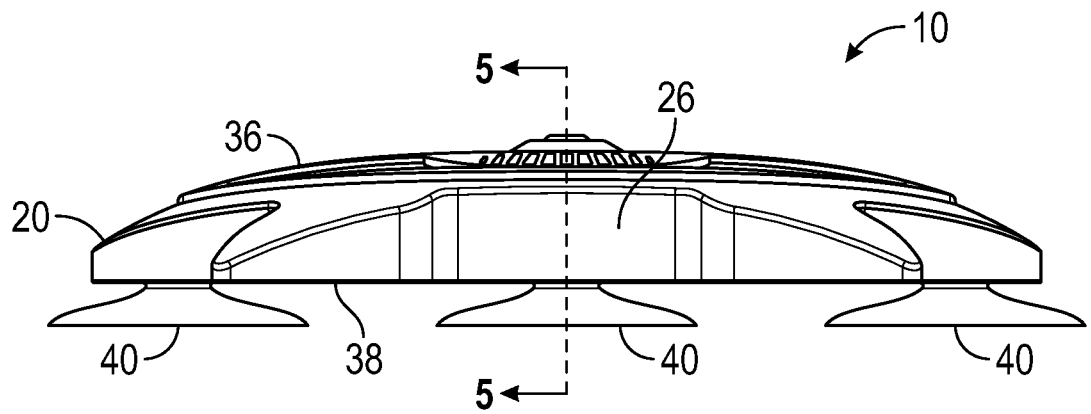
FIG. 4 is a bottom elevation view of an example embodiment.
Figure 9:
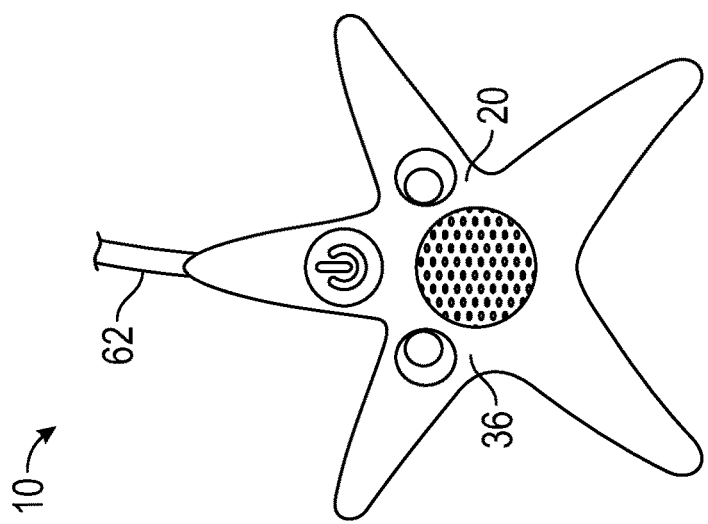
FIGS. 7 through 9 are elevation views of example embodiments configured to resemble differing animals or characters.
Figure 8:
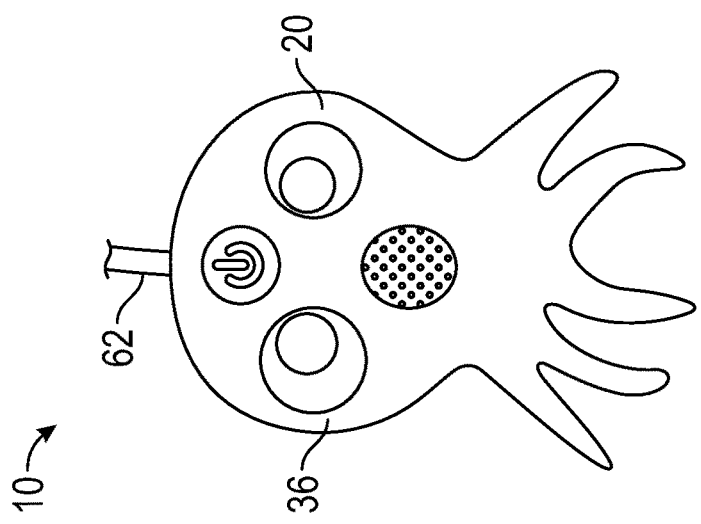
Figure 7:
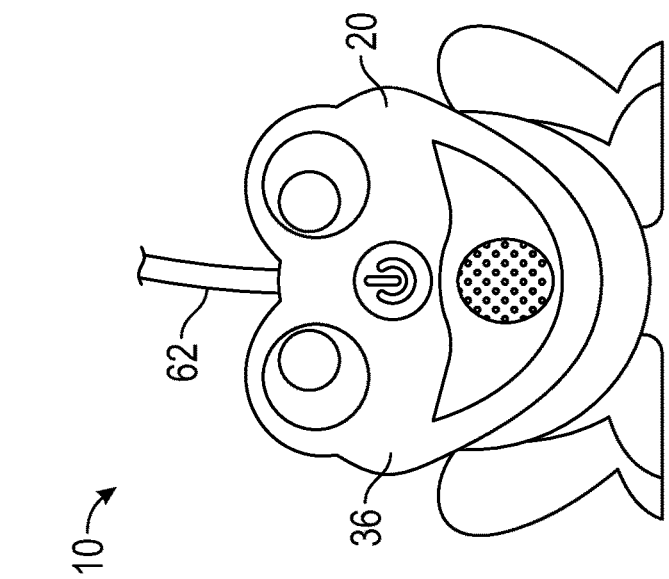
Figure 10:
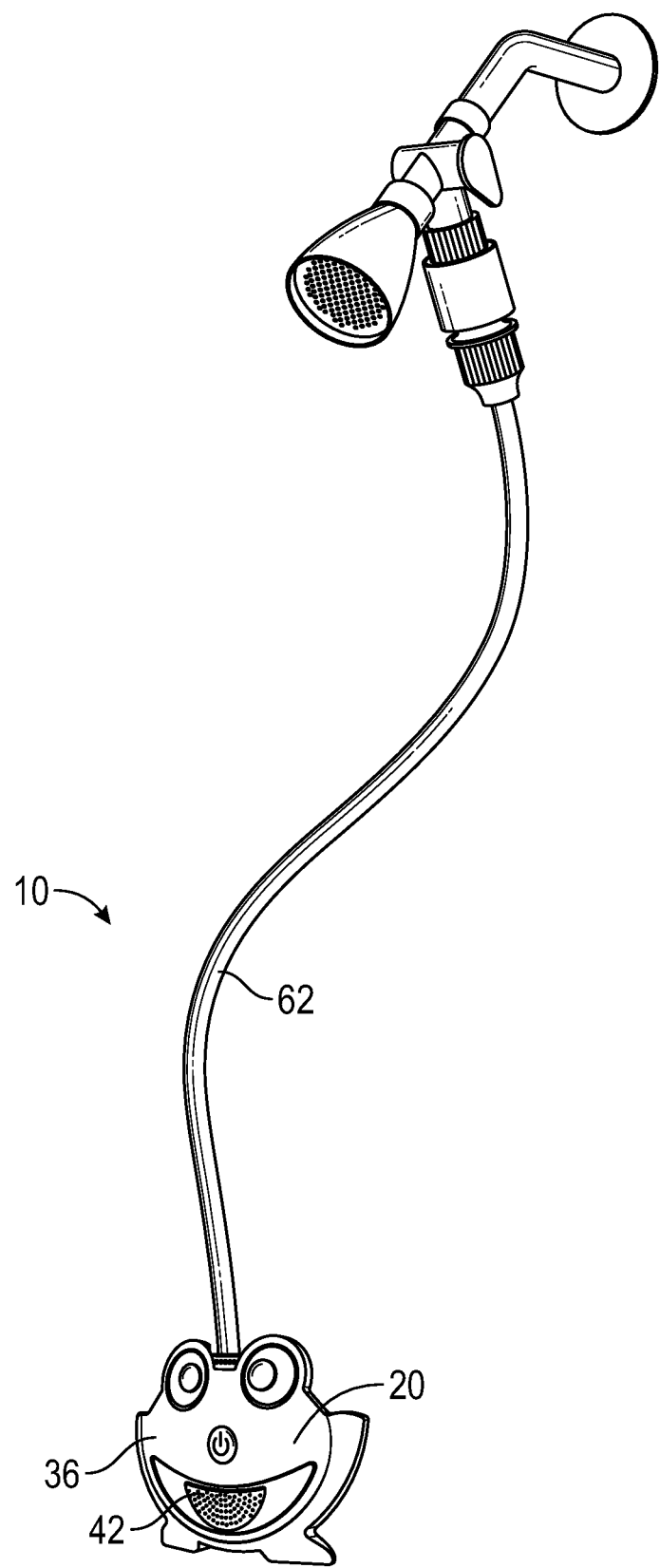
FIG. 10 is an in-use view of an example embodiment interconnected with a shower main.

With reference now to the drawings, and in particular FIGS. 1 through 11 thereof, example of the instant surface attachable washing apparatus employing the principles and concepts of the present surface attachable washing apparatus and generally designated by the reference number 10 will be described.

Referring to FIGS. 1 through 11 a preferred embodiment of the surface attachable washing apparatus 10 is illustrated.

The present surface attachable washing apparatus 10 has been devised to enable controlled emission of water through a plurality of outlets 42 disposed in an obverse surface 36 of a molded body member 20. The surface attachable washing apparatus 10 is attachable to a surface such as a shower wall or bath tub and connectable to an existing water outlet, faucet, shower line, or shower main, as case may be, whereby the molded body member 20 is securable in a position at a desired height proximal a user to emit sprayed water therefrom. The plurality of outlets 42 disposed in the obverse surface 36 of the molded body member 20 enables controlled outflow of water when an interior valve assembly 48 is activated between a closed situation and an open situation, whereby throughflow of water from a connecting line 62 is directable out each of the plurality of outlets 42 for controlled application directly to a user proximal to the obverse surface 36. Simple depression of the obverse surface 36 in a position appropriate to engage a compressible portion 50 of the valve assembly 48 enables easy activation and deactivation of the apparatus 10 so that a child is able to toggle water flow as desired, increasing fun at bath time.

Discussing now the drawings of an example embodiment of the present device 10 depicted herein, the present surface attachable washing apparatus 10, therefore, includes a generally planar molded body member 20 having an obverse surface 36 configured in a form reminiscent of a frog. The molded body member 20 is contemplated to by polymeric and flexible, and includes a first side apex 22, a second side apex 24, a distal arced edge 26, and a proximal arced edge 28. In the example embodiment shown in FIG. 1, for example, the first side apex 22 and the second side apex 24 are configured to resemble the rear legs of the stylized frog.

The molded body member 20 a reverse surface 38. At least one suction cup 40 is disposed upon the reverse surface 38 whereby the molded body member 20 is securable to a surface, such as a shower wall, bath tub, or other surface as case may be. In the example embodiment depicted in FIGS. 1 through 7, the molded body member is configured in the form of a stylized frog. Additional forms of animals or character are contemplated, such as the example embodiments shown in FIGS. 8 and 9, wherein the molded body member is configured in the form of an octopus (FIG. 8) and a starfish (FIG. 9), generally aquatic animals associable with water and thus bath time.

As shown particularly in FIGS. 1 through 9, the plurality of outlets 42 is disposed as a cluster and may be positioned to signal emission of water through a particular body part of the animal or character in which form the molded body member is preferentially configured. For example, as best shown in FIG. 1, the plurality of outlets 42 may be clustered in a position to emit water from a portion of the obverse surface associated with the animal or character's mouth.

As best shown in FIGS. 5 and 6, a valve assembly 48 is disposed interiorly within the molded body member 20 in open communication with each of the plurality of outlets 42. The valve assembly 48 includes a compressible portion 50 devised to alternately open and close a valve outlet 52 when depressed. The compressible portion 50 is situated in a position interior to the molded body member 20 proximally underlying a corresponding portion of the obverse surface 36 demarked in a visually appropriate manner, whereby said user may effect depression of the compressible portion 50 with said user's fingers by pressing the obverse surface 36 thereatop. The compressible portion 50 is disposed against the action of a first spring member 54 disposed to return the compressible portion 50 to an uncompressed position once released. When compressed, the compressible portion 50 enables reorientation of a first switch member 55 between a first position and a second position, as will be described subsequently.

When moved to the first position, the first switch member 55 forces switch member 56 in a first direction against the action of a second spring member 58, whereby the switch member 56 tensions said second spring member 58. The second spring member 58 is prevented from rebounding, however, by action of a stop member 60 against which the switch member 56 is oriented, whereby the valve outlet 52 is maintained open and the valve assembly 48 is rendered in the open situation. Subsequent depression of the compressible portion 50 causes the first switch member 55 to reorient the switch member 56 by effecting movement in a second direction, whereby the switch member 56 is disengaged with the stop member 60, and the second spring member 58 is enabled to rebound and to return the switch member 56 to the second position wherein the valve outlet 52 is closed and the valve assembly 48 is rendered in the closed situation. Alternate depressions of the compressible portion 50 therefore toggle the valve assembly 48 between the open situation and closed situation to control water emission through the plurality of outlets 42.

The connecting line 62 is disposed attached at a proximal inlet 64 medially disposed in the proximal arced edge 28 of the molded body member 20 and may be secured thereat by means of a connect housing 66. The connecting line 62 may be detachable from the connect housing 66. The connecting line 62 is distally attachable to a water outlet, such as an existing hose pipe, faucet, shower line, or shower main, for example. Opening said tap, or faucet, enables flow of water into the connecting line 62 and into the molded body member 20. Water is prevented from exiting through the plurality of outlets 42 disposed upon the obverse surface 36 until the valve assembly 48 is disposed in the open situation.

Figure 11:
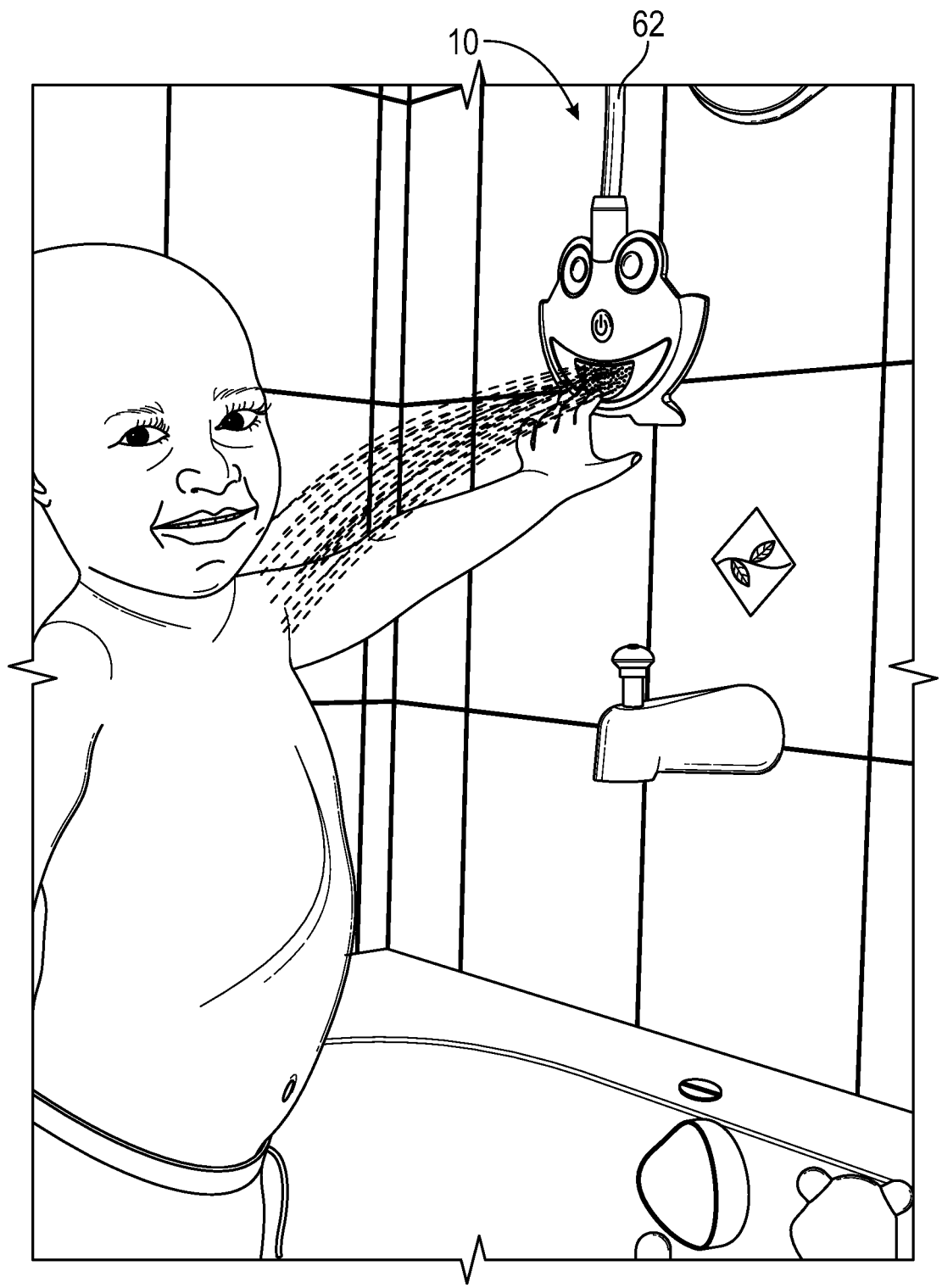
FIG. 11 is an in-use view of an example embodiment.

Compression of the compressible portion 50 therefore enables selective opening and closing of the valve assembly 48 between the open and closed situations whereby outflow of water is controllable by a child during, for example, bath time. As shown in FIG. 11, a user may, therefore, interconnect the present surface attachable washing apparatus 10 to an existing water outlet, secure the molded body member to a shower wall, bath tub, or other surface, and enable selective emission of water at a desired height relative a user, and particularly a child, whereby fun is had when washing during bath time.

What is claimed is:

1. A surface attachable washing apparatus comprising:
   a flexible molded body member;
   a reverse surface disposed upon the molded body member;
   at least one suction cup disposed upon the reverse surface;
   an obverse surface;
   a plurality of outlets disposed upon the obverse surface;
   a proximal inlet in open communication with each of the plurality of outlets, said proximal inlet connectable to a connecting line for conveyance of water therethrough;
   a valve assembly disposed interiorly within the body member, said valve assembly comprising:
   a compressible portion disposed against the action of a first spring member, said compressible portion compressible between a compressed position and an uncompressed position;
   a switch member in operational communication with the compressible portion, said switch member rotatably alternately positionable between a first position and a second position when the compressible portion is compressed;
   a second spring member tensioned against the switch member when the switch member is moved from the first position to the second position; and
   a stop member disposed to prevent rebound of the second spring member returning the switch member to the first position until the compressible portion is again compressed and the switch member is rotatably disengaged from the stop member;
   wherein sequential compression of the compressible portion alternately renders the valve assembly in an open configuration and a closed configuration whereby control of water flow though the valve assembly is effective by singlehanded use of a user.

2. The surface attachable washing apparatus of claim 1 wherein the molded body member is configured in the form of an animal or character.

3. The surface attachable washing apparatus of claim 2 wherein each of the plurality of outlets is disposed in a position to emit water from a mouth of the animal or character.

4. The surface attachable washing apparatus of claim 3 wherein the compressible portion of the valve assembly is disposed interior to the molded body member in a position underlying an area of the obverse surface approximate to a nose of the animal or character.

5. The surface attachable washing apparatus of claim 4 wherein the molded body member further comprises a connect housing disposed at the proximal inlet whereby the connecting line is securable into the connect housing.

6. The surface attachable washing apparatus of claim 5 wherein the connecting line is interconnectable with a diverter switch installable into an existing shower main line.

7. The surface attachable washing apparatus of claim 6 wherein the molded body member is formed of a flexible polymer.

8. A surface attachable washing apparatus comprising:
   a molded body member configured in the form or an animal or a character, said molded body member having an obverse surface and a reverse surface;

at least one suction cup disposed upon the reverse surface for attachment of the molded body to a surface;
a plurality of outlets disposed upon the obverse surface;
a proximal inlet disposed in at one edge of the molded body member, said proximal inlet disposed in open communication with each of the plurality of openings;
a connecting line disposed attachable at the proximal inlet, said connecting line distally attachable to an existing water outlet, a faucet, or interconnectable with a shower main; and
a valve assembly disposed interiorly within the molded body member between the proximal inlet and each of the plurality of openings, said valve assembly operable between a first position and a second position to selectively control water flow to each of the plurality of openings;
wherein sequential compression of the compressible portion alternately renders the valve assembly in an open configuration and a closed configuration.

9. The surface attachable washing apparatus of claim 8 wherein the valve assembly comprises:
a compressible portion disposed against the action of a first spring member, said compressible portion compressible between a compressed position and an uncompressed position;
a switch member in operational communication with the compressible portion, said switch member rotatably alternately positionable between a first position and a second position when the compressible portion is compressed;
a second spring member tensioned against the switch member when the switch member is moved from the first position to the second position; and
a stop member disposed to prevent rebound of the second spring member returning the switch member to the first position until the compressible portion is again compressed and the switch member is rotatably disengaged from the stop member.

10. The surface attachable washing apparatus of claim 9 wherein the molded body member further comprises a connect housing disposed at the proximal inlet whereat the connecting line is attachable.

11. The surface attachable washing apparatus of claim 10 wherein the molded body member is polymeric and flexible.

12. The surface attachable washing apparatus of claim 11 wherein the molded body member is made of silicone.

13. The surface attachable washing apparatus of claim 12 wherein the plurality of outlets are proximally disposed into at least one cluster, said at least one cluster positioned upon obverse surface of the molded body member to emit sprayed water from a specific part of the animal or character of which the molded body member is devised to resemble, wherein the appearance of water emitted resembles water spraying from said specific part of the animal or character.

14. A surface attachable washing apparatus comprising:
a polymeric, flexible molded body member devised of silicone and configured in the form of an animal or a character, said molded body member having an obverse surface and a reverse surface;
at least one suction cup disposed upon the reverse surface;
a plurality of outlets disposed upon the obverse surface in a position devised to correspond with a body part of the animal or character;
a proximal inlet medially disposed in at least one edge of the molded body member, said proximal inlet disposed in open communication with each of the plurality of outlets;
a connect housing disposed at the proximal inlet;
a connecting line disposed attachable at the connect housing, said connecting line distally attachable to an existing water outlet, a faucet, or to a shower mains;
a valve assembly disposed interiorly within the molded body member, said valve assembly disposed between the proximal inlet and each of the plurality of openings, said valve assembly operable between a closed configuration and an open configuration to selectively control water flow through each of the plurality of openings, said valve assembly including:
a compressible portion disposed against the action of a first spring member, said compressible portion compressible between a compressed position and an uncompressed position;
a switch member in operational communication with the compressible portion, said switch member rotatably alternately positionable between a first position and a second position when the compressible portion is compressed;
a second spring member tensioned against the switch member when the switch member is moved from the first position to the second position; and
a stop member disposed to prevent rebound of the second spring member returning the switch member to the first position until the compressible portion is again compressed and the switch member is rotatably disengaged from the stop member;
wherein sequential compression of the compressible portion alternately renders the valve assembly in an open configuration and a closed configuration whereby control of water flow though the valve assembly is effective by singlehanded use of a user.

15. The surface attachable washing apparatus of claim 7 wherein the flexible polymer comprises silicone.

* * * * *